(12) United States Patent
Yang

(10) Patent No.: US 6,828,754 B2
(45) Date of Patent: Dec. 7, 2004

(54) CHARGING DEVICE WITH TWO-WAY INPUT/OUTPUT FROM THE BATTERY HOLDER

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 10 days.

(21) Appl. No.: 10/382,628

(22) Filed: Mar. 7, 2003

(65) Prior Publication Data

US 2004/0174140 A1 Sep. 9, 2004

(51) Int. Cl.$^7$ .............................................. H01M 10/46
(52) U.S. Cl. ....................................... 320/103; 320/138
(58) Field of Search ................................ 320/103, 138, 320/107, 112, 113, 114, 115, 116, 118, 119

(56) References Cited

U.S. PATENT DOCUMENTS 6,137,260 A * 10/2000 Wung et al. ................. 320/116
6,204,632 B1 * 3/2001 Nierescher et al. ......... 320/116

* cited by examiner

*Primary Examiner*—Edward H. Tso
(74) *Attorney, Agent, or Firm*—Rabin & Berdo, P.C.

(57) ABSTRACT

A portable, multi-purpose charging device to charge a primary battery, or one unit or multiple units of secondary battery having same or different voltage than that of the primary battery, and to execute emergency charging to the secondary battery by the primary battery.

3 Claims, 3 Drawing Sheets

CHARGING DEVICE WITH TWO-WAY INPUT/OUTPUT FROM THE BATTERY HOLDER

BACKGROUND OF THE INVENTION (a) Field of the Invention

The present invention is related to a charging device, and more particularly to a multi-purpose, portable charger to charge a first battery or at least one set of identical or different second batteries, and to execute emergency charging to the second battery by the first battery.

(b) Description of the Prior Art

A charger of the prior art usually has its power supplied from a DC output rectified from an AC source, or directly from a DC source, such as from a cigarette lighter in an automobile, to charge a battery placed in a battery holder. Alternatively, a battery already fully charged is placed into the battery holder to output through a plug and socket set for serving as an emergency charger. However, both are of standing alone types and once used up, the emergency charger is replaced with a new one, or in case of a rechargeable type, another charger is required to charge the emergency charger. Therefore, it is not economical or convenient to carry both types of chargers.

SUMMARY OF THE INVENTION

The primary purpose of the present invention is to provide a charging device that allows two-way input and output provided by a battery holder, essentially comprised of a charging source, a charging circuit, a holder of the first battery, at least one unit of second battery holder or at least one plug and socket unit to externally output charging potentials, a casing and an indicator characterized by that:

(1) an external source is used to charge a first battery in the first battery holder through the charging circuit;
(2) the external source is also used through the charging circuit, or one unit or multiple units of plug and socket to charge one unit or multiple units of second battery holder;
(3) the external source is further used through the charging circuit to charge the first battery from the first battery holder, and to charge one unit or multiple units of second battery through one unit or multiple units of the second battery holder, or through one unit or multiple units of the plug and socket set; and
(4) the battery placed in the first battery holder is used through the charging circuit to charge one unit or multiple units of the second battery holder; or to charge one unit or multiple units of the second battery through one unit or multiple units of the plug and socket set.

DETAILED DESCRIPTION OF THE PREFERRED EMBODIMENTS

The present invention provides an advanced and multi-purpose operation system in a system configuration featuring the use of a source input to execute a charging output to the battery to provide additional functions to the conventional portable charging system.

Figure 1:
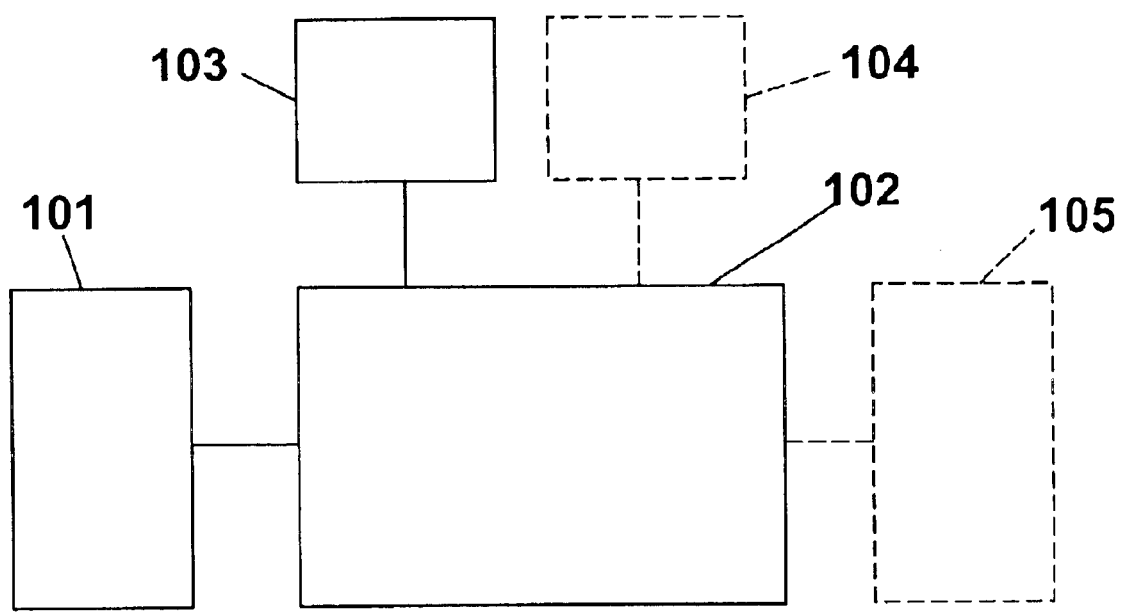
FIG. 1 is a circuit block chart of the present invention.

FIG. 1 shows a circuit block chart of the present invention. A charging device of the present invention, that allows two-way input and output provided by the battery holder, essentially includes a charging source, a charging circuit, a first battery holder, one unit or multiple units of a second battery holder, or one unit or multiple units of a plug and socket set, a casing, and an indicator to charge the first battery, or to charge one unit or multiple units of the second batteries having a voltage the same as or different from that of the first battery. The charging device also executes emergency charging to the second battery by the first battery. The charging source 101 is supplied by DC rectified from AC city power, or is directly supplied by a DC source. The structure of the charging device with two-way input and output provided by the battery holder of the present invention includes a control circuit 102. The control circuit 102 includes a dynamo-electric or a solid state electronic device to input the charging potentials, that are supplied to the first battery holder 103, to be coupled to a first battery placed in the first battery holder 103 to execute charging operation and control. The charging potentials are also supplied to the second battery holder 104 or to the plug and socket set 105 for the second battery coupled to the second battery holder 104 or the plug and socket set 105 to execute a charging operation and control. The control circuit 102 also controls and operates the battery placed in the first battery holder 103 to execute emergency charging to the second battery placed in the second battery holder 104, or to the second battery coupled to the plug and socket set 105.

One unit or multiple units of either the second battery holder 104 or the plug and socket set 105 or both may be provided as required.

Figure 2:
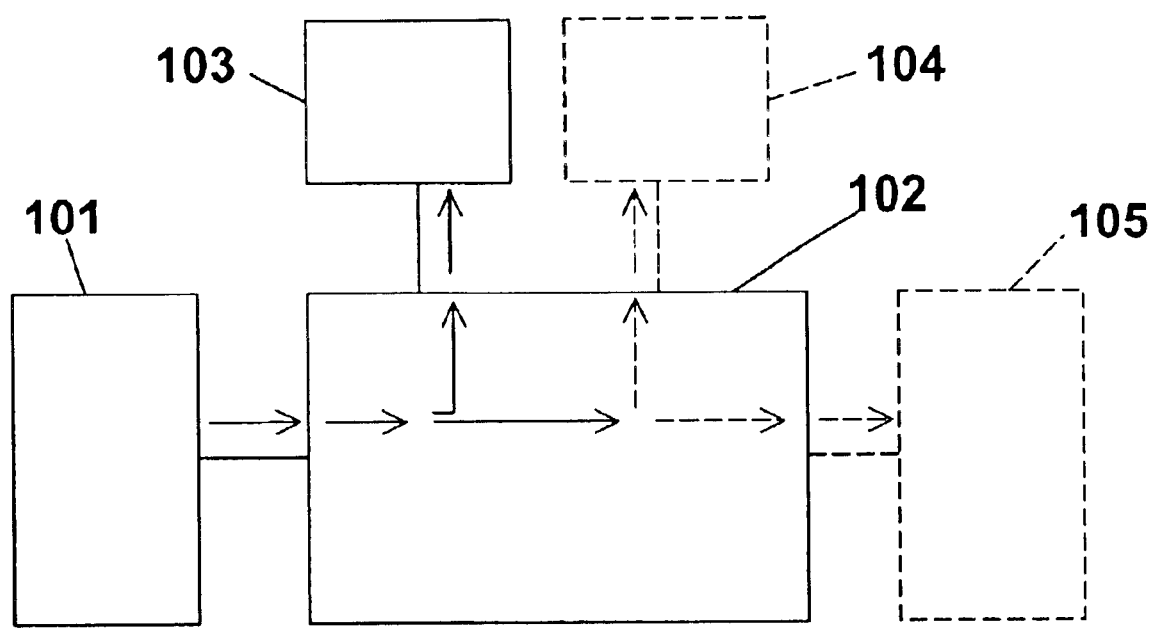
FIG. 2 is a schematic view showing that a source is supplying power to first and second battery holders or plug and socket unit of the present invention.
Figure 3:
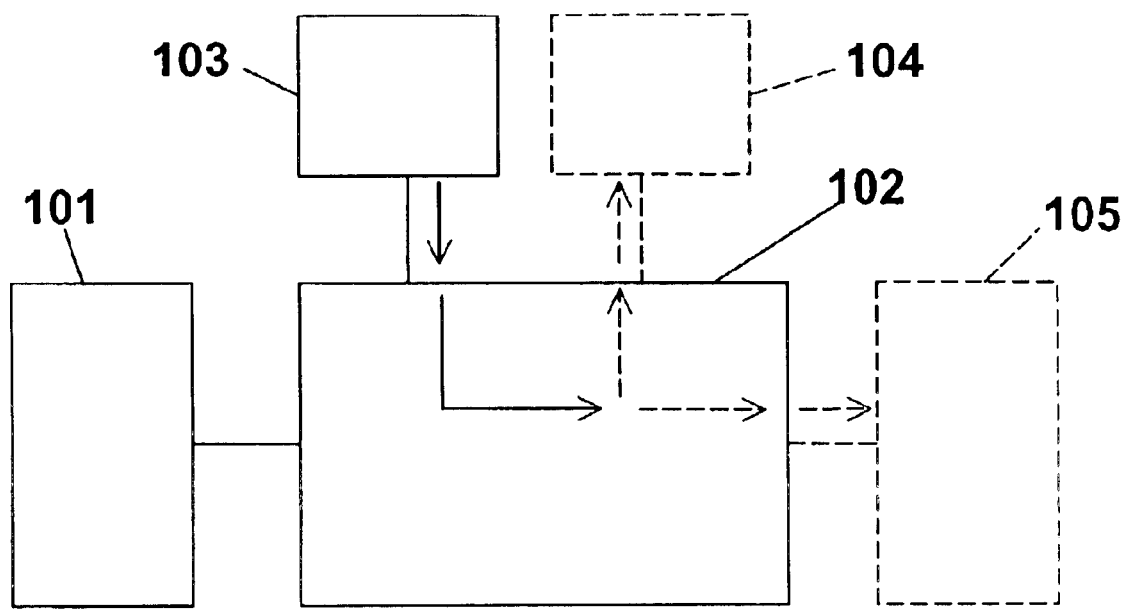
FIG. 3 is a schematic view showing that a battery is placed in the first battery holder to supply power to the second battery holder or the plug and socket unit.

Functions of the charging device with two-way input and output provided by the battery holder include:

(1) an external source is used to charge a first battery in the first battery holder through the charging circuit;
(2) the external source is also used through the charging circuit, or one unit or multiple units of plug and socket to charge one unit or multiple units of the second battery holder;
(3) the external source is further used through the charging circuit to charge the first battery from the first battery holder, and to charge one unit or multiple units of the second battery through one unit or multiple units of the second battery holder, or through one unit or multiple units of the plug and socket set. As illustrated in FIG. 2, the source is used to supply power to the first battery holder and the second battery holder or the plug and socket set;
(4) the battery placed in the first battery holder is used through the charging circuit to charge one unit or multiple units of the second battery holder, or to charge one unit or multiple units of the second battery through one unit or multiple units of the plug and socket set. The charging device with two-way input and output provided by the battery holder is characterized by that it contains the function as disclosed in Subparagraph (4) and one or more than one of those functions disclosed in Subparagraphs (1), (2) and (3) herein.

The charging device with two-way input and output provided by the battery holder comprised of a casing to house a first battery holder, and an optional second battery holder or a plug and socket set to charge a first battery or one unit or multiple units of second battery having voltage same as or different from that of the first battery, and to execute emergency charging to the second battery by the first battery, is innovative with specific functions. Therefore, this application is duly filed accordingly.

What is claimed is:

1. A charging device that allows two-way input and output provided by a battery holder, comprising:
   a charging source;
   a charging circuit;
   a first battery holder;
   at least one of a second battery holder and a plug and socket unit to externally output charging potentials;
   a casings; and
   an indicator,
   wherein an external source is used to charge a first battery in the first battery holder through the charging circuit;
   the external source is also used through the charging circuit, or the plug and socket unit to provide a charge to the second battery holder;
   the external source is further used through the charging circuit to charge the first battery from the first battery holder, and to charge the second battery through the second battery holder, or through the plug and socket set; and
   the first battery placed in the first battery holder is used through the charging circuit to provide a charge to the second battery holder; or to charge the second battery through the plug and socket set.

2. The charging device as claimed in claim 1, wherein said charging device charges the first battery, or charges the second battery, the second battery having a voltage that is the same as or different from that of the first battery, and executes emergency charging to the second battery by the first battery, the charging source being supplied by DC rectified from an AC city power, or being directly supplied by a DC source, the charging circuit further comprising a control circuit comprised of a dynamo-electric or a solid state electronic device to input the charging potentials, that are supplied to the first battery holder to be coupled to the first battery placed in the first battery holder to execute charging operation and control, and that are also supplied to the second battery holder or to the plug and socket set for the second battery coupled to the second battery holder or the plug and socket set to execute charging operation and control, the control circuit also controlling and operating the first battery placed in the first battery holder to execute emergency charging to the second battery placed in the second battery holder, or to the second battery coupled to the plug and socket set, wherein either the second battery holder or the plug and socket set or both may be provided as required.

3. The charging device as claimed in claim 1, wherein the external source is used to charge the first battery in the first battery holder through the charging circuit;
   the external source is also used through the charging circuit, or the plug and socket to provide a charge to the second battery holder;
   the external source is further used through the charging circuit to charge the first battery from the first battery holder, and to charge the second battery through the second battery holder, or through the plug and socket set; and
   the first battery placed in the first battery holder is used through the charging circuit to provide a charge to the second battery holder, or to charge the second battery through the plug and socket set.

* * * * *